United States Patent

Wang et al.

[11] Patent Number: 6,149,721
[45] Date of Patent: Nov. 21, 2000

[54] SOLVENT-BASED PEN INKS

[75] Inventors: Yichun Wang, Canton; Russell E. Hopson, Jamaica Plain, both of Mass.

[73] Assignee: The Gillette Company, Boston, Mass.

[21] Appl. No.: 09/244,538

[22] Filed: Feb. 3, 1999

[51] Int. Cl.[7] ................................................. C09D 11/02
[52] U.S. Cl. ..................................... 106/31.32; 106/31.58
[58] Field of Search ............................. 106/31.32, 31.58

[56] References Cited

U.S. PATENT DOCUMENTS

| | | | |
|---|---|---|---|
| 2,029,152 | 1/1936 | Bonkowski | 401/186 |
| 3,886,083 | 5/1975 | Laxer | 106/31.32 |
| 3,941,488 | 3/1976 | Maxwell | 401/17 |
| 4,139,965 | 2/1979 | Curry et al. | 434/84 |
| 4,156,657 | 5/1979 | Lin | 106/31.32 |
| 4,171,982 | 10/1979 | Lin | 106/31.21 |
| 4,213,717 | 7/1980 | Lin | 106/31.32 |
| 4,227,930 | 10/1980 | Lin | 106/31.23 |
| 4,228,028 | 10/1980 | Lin | 106/31.93 |
| 4,252,845 | 2/1981 | Griffiths et al. | 106/31.32 |
| 4,557,618 | 12/1985 | Iwata et al. | 106/31.23 |
| 4,578,117 | 3/1986 | Nakanishi | 106/31.32 |
| 4,681,471 | 7/1987 | Hayduchok et al. | 106/31.58 |
| 5,006,171 | 4/1991 | Mecke et al. | 106/31.93 |
| 5,043,013 | 8/1991 | Kluger et al. | 106/31.32 |
| 5,059,244 | 10/1991 | King et al. | 106/31.32 |
| 5,116,410 | 5/1992 | Miller | 106/31.58 |
| 5,232,494 | 8/1993 | Miller | 106/31.33 |
| 5,324,131 | 6/1994 | Gardner, III | 401/199 |
| 5,326,388 | 7/1994 | Miller et al. | 106/31.32 |
| 5,352,282 | 10/1994 | Miller | 106/31.32 |
| 5,378,752 | 1/1995 | White et al. | 524/418 |
| 5,427,278 | 6/1995 | Gardner, III | 106/31.93 |
| 5,460,647 | 10/1995 | Snedeker et al. | 106/31.19 |
| 5,464,470 | 11/1995 | Brachman et al. | 106/31.08 |
| 5,478,382 | 12/1995 | Miller et al. | 106/31.28 |
| 5,486,228 | 1/1996 | Miller et al. | 106/31.32 |
| 5,649,999 | 7/1997 | Wang | 106/31.32 |
| 5,700,316 | 12/1997 | Pontes et al. | 106/31.29 |
| 5,711,790 | 1/1998 | Coller | 106/31.01 |

FOREIGN PATENT DOCUMENTS

| | | |
|---|---|---|
| 0 032 653 A2 | 12/1979 | European Pat. Off. . |
| 0 032 652 A2 | 7/1981 | European Pat. Off. . |
| 2 216 951 | 10/1973 | Germany . |
| 23 49 086 A1 | 4/1975 | Germany . |
| 27 24 820 A1 | 12/1978 | Germany . |
| 28 34 459 A1 | 3/1980 | Germany . |
| 2616259 | 3/1981 | Germany . |
| 55-50075 | 10/1978 | Japan . |
| 56-98268 | 12/1979 | Japan . |
| 57-16077 | 7/1980 | Japan . |

*Primary Examiner*—Helene Klemanski
*Attorney, Agent, or Firm*—Fish & Richardson P.C.

[57] ABSTRACT

Solvent-based pen inks are provided. The inks include an acid dye and a solvent system that includes an oxa acid solvent, the oxa acid solvent functioning as the primary solvent for the acid dye. Preferred inks are eradicable, and include an acid dye that decolorizes if contacted with a decolorizing compound.

21 Claims, No Drawings

SOLVENT-BASED PEN INKS

BACKGROUND OF THE INVENTION

The present invention relates to solvent-based pen inks.

Solvent-based pen inks are widely used in writing instruments, particularly in ball point pens. These inks generally include a resin binder, a colorant, e.g., a dye, and a solvent for the colorant. Because colorants are relatively expensive, it is generally desired to include as little colorant as possible without undesirably compromising the color intensity of markings made with the ink.

Acid dyes are desirable for use as colorants in pen inks, due to their good color intensity. Some acid dyes are useful in eradicable inks, i.e., inks that form markings that can be eradicated by writing over the marking with an eradicator fluid that includes a substance that can cause the dye to convert to a colorless form. Acid dyes are generally used only in aqueous inks, however, because they are not significantly soluble in many of the non-volatile organic solvents commonly used in ball-point pen inks. Because most aqueous inks are not suitable for use in ball point pens, acid dye-containing eradicable inks are generally not used in ball point pens.

SUMMARY OF THE INVENTION

The present invention features solvent-based inks containing acid dyes (e.g., eradicable inks). The inks exhibit good color intensity at relatively low colorant levels, and are suitable for use in ball point pens. Moreover, the inks are hydrophilic, and thus generally can be used to write over damp areas, e.g., an area which has been eradicated with an aqueous eradicator fluid. In one aspect, the invention features a solvent-based pen ink that includes an acid dye and a solvent system that includes an amount of oxa acid solvent sufficient to dissolve said acid dye.

Preferably, the oxa acid solvent functions as the primary solvent for the acid dye. By "primary solvent", it is meant that while the solvent system may contain other organic solvents and/or water, at least 40% of the total amount of solvent in the solvent system is an oxa acid.

The preferred oxa acid solvents have one of the following general formulas:

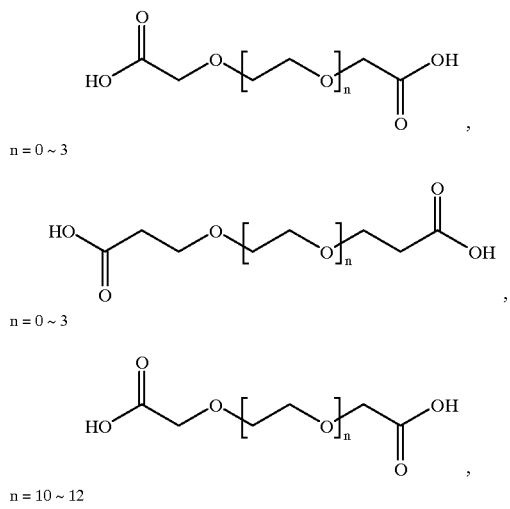

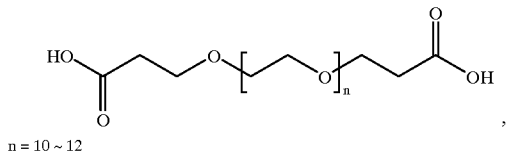

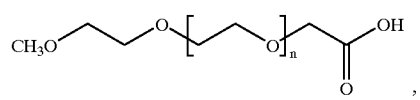

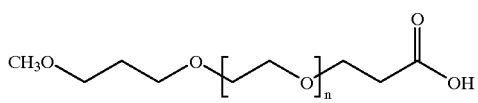

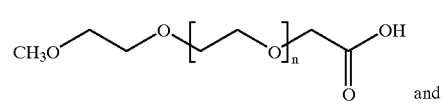

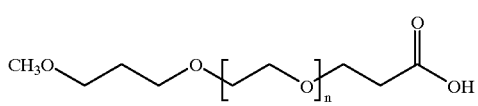

Preferably, the ink includes a blend of oxa acid solvents, more preferably a blend of a mono-acid and a di-acid, most preferably a blend of a 3,6,9-trioxaundecanedioic acid with a 3,6,9-trioxaundecanonic acid. The preferred acid dyes are selected from the group consisting of carboxylated and sulfonated dye salts. Preferably, the ink contains less than 25% of the acid dye, more preferably less than 20%. It is also preferred that the solvent system contain at least 40%, more preferably at least 50% of the oxa acid solvent.

In another aspect, the invention features an eradicable ink comprising an acid dye that decolorizes if contacted with a decolorizing compound (e.g., a base), and a solvent comprising an oxa acid solvent in a sufficient quantity to dissolve the acid dye.

In a further aspect, the invention features eradicator systems that include (a) an eradicable ink comprising an acid dye that decolorizes if contacted with a decolorizing compound, and a solvent comprising an oxa acid solvent in a sufficient quantity to dissolve the acid dye; and (b) an eradictor fluid comprising a compound selected to cause the acid dye to change color. Preferred eradicator systems further include a write-over ink including a dye selected to allow the write-over ink to form a permanent marking over an area covered by the eradicator fluid, and the write-over ink includes a solvent system including an oxa acid solvent.

The invention also features methods of eradicating markings.

"Dissolve", as used herein, means that the dye dissolves in sufficient quantity to cause a significant color change in the solvent at 25° C.

"Acid dye", as used herein, includes all dyes that are acidic, including both dyes referred to as "acid dyes" and dyes referred to as "direct dyes".

All percentages specified herein are by weight unless otherwise stated.

Other features and advantages of the invention will be apparent from the following description of a presently preferred embodiment, and from the claims.

DESCRIPTION OF THE PREFERRED EMBODIMENTS

Preferred inks include an acid dye and a solvent system that includes at least 40% of one or more oxa acid solvents. Preferred eradicable inks include triaryl methane dyes, e.g., Acid Blue 93, that are capable of decolorizing in the presence of a base. Preferred non-eradicable inks include carboxylated and sulfonated dye salts.

Preferred oxa acid solvents have one of the following general formulas:

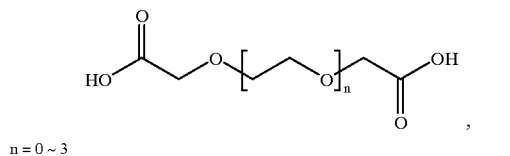

n = 0 ~ 3

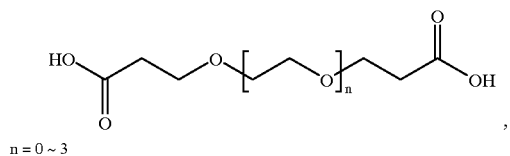

n = 0 ~ 3

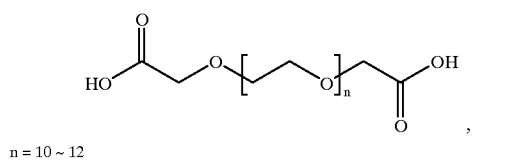

n = 10 ~ 12

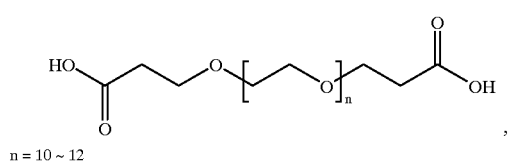

n = 10 ~ 12

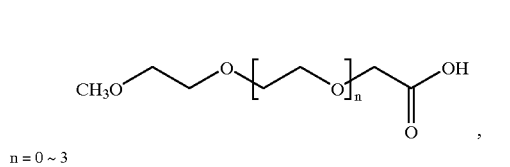

n = 0 ~ 3

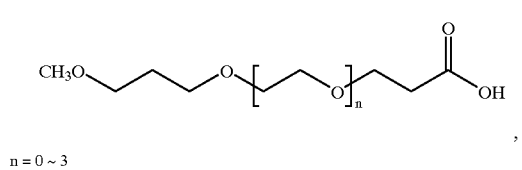

n = 0 ~ 3

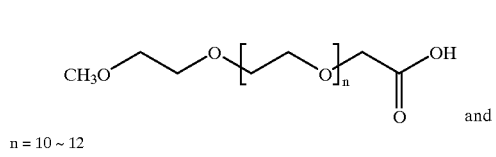

and n = 10 ~ 12

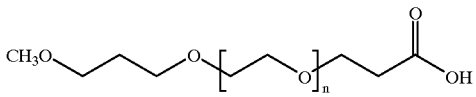

n = 10 ~ 12

The preferred oxa acid solvents have a combination of lipophilic moieties, hydrophilic groups and an acid/base function, and have relatively low melting points and relatively high boiling points (e.g., flash points above 200° C.). Other properties of the oxa acid solvents include solubility in media of widely differing polarity, development of surface active properties, and good complexing ability with metal ions. Examples of suitable oxa acid solvents include oxa acids having an acetonic end group, for example, methoxyacetic acid, diglycolic acid, 3,6-dioxaheptanoic acid, 3,6,9-trioxaundecanoic acid, 3,6,9-trioxadecanoic acid, and polyglycol diacid (n=10–12), all of which are commercially available from Hoechst Celanese Corp., Fine Chemicals Division, Charlotte, N.C. Other suitable oxa acid solvents include a propionic acid end group at the terminus of the oxa chains, for example 4,7-dioxaoctanoic acid, 4,7,10-trioxatridecanedioic acid, 4,7,10-trioxaundecanoic acid and polyglycol diacid (n=3–12). These oxa acid solvents can be readily prepared by those skilled in the chemical art. For a good balance of solvating properties and low viscosity, in some cases it is preferred that the solvent system contain a blend of two or more oxa acid solvents that, in combination, provide this balance. A suitable blend is a di-oxa acid, e.g., 3,6,9-trioxaundecanedioic acid, to provide good solubility, with a mono-oxa acid, e.g., 3,6,9-trioxadecanoic acid, to reduce viscosity. Preferred ratios of di-acid to mono-acid are from 3:1 to 1:3, more preferably from 3:2 to 2:3.

The solvent system may contain one or more co-solvents that are not oxa acid solvents. For example, a co-solvent may be selected to dissolve the resin binder, if the resin binder is not readily soluble in the oxa acid solvent. Also, a hydrophobic co-solvent may be added to reduce the hydrophilicity of the ink and thereby reduce or prevent leakage in humid environments. Suitable co-solvents include glycols, such as ethylene glycol ethyl ether, ethylene glycol methyl ether, ethylene glycol dimethyl ether, ethylene glycol diethyl ether, di(ethylene glycol) ethyl ether, di(ethylene glycol) methyl ether, di(ethylene glycol) diethyl ether, di(ethylene glycol) dimethyl ether, propylene glycol dimethyl ether, propylene glycol methyl ether, propylene glycol diethyl ether, di(ethylene glycol) tri(ethylene glycol) and tetra(ethylene glycol). The solvent system generally includes from 0–60% of the co-solvent(s).

Triaryl methane dyes that are capable of decolorizing in the presence of a base are known to those skilled in the art. Triaryl methane dyes include three aryl groups covalently bonded to a methyl group. Each aryl group may have, for example, a sulfonate group ($SO_3$) attached. Examples include Acid Blue 93 and Acid Blue 22. Enough dye should be included in the ink to provide the desired color intensity, but not so much that large quantities of eradicator fluid must be applied to a mark made with the ink to cause it to decolorize. Preferred inks include between 10 and 25%, and more preferably approximately 15%, of the triaryl methane dye.

Preferred non-eradicable acid dyes and direct dyes have sulfonate groups with sodium counterions. Preferred acid dyes include, for example, Acid Violet 3R (CI 42720), Acid Blue 83 (CI 42660), Food Green 3 (CI 42053), Acid Green 6 (CI 42075), Acid Blue 9 (CI 42090), Acid Red 52 (CI 45100), Acid Green 5 (CI 42095), Alpine Blue (CI42572) and Acid Violet 19 (CI 42685). Preferred direct dyes include Direct Blue 133 (CI34005), Direct Black 48 (CI 34000), Direct Red 103 (CI 34025), Direct Blue 82 (CI 34130), Direct Blue 78 (CI 34200) and Direct Green 33 ( 34270).

Some preferred inks also include a thickener, e.g., a polymer, to prevent leakage of the ink from a ball point pen. Suitable polymers include ketone/formaldehyde resins such as the resin available from Huls America, Rockleigh, N.J. under the tradename "RESIN SK". Preferably the polymer has a number average molecular weight of about $1 \times 10^4$ to $5 \times 10^5$ daltons. Preferred inks contain from about 10 to 25% thickener.

Some preferred inks further include an elastomer, e.g., polyvinylpyrollidone (PVP), to cause the ink to draw away from the ball when the user of the pen is not writing. Preferred inks contain from about 0.3 to 0.6% elastomer.

Other conventional ingredients such as lubricating agents, bactericides, thickeners, and colorants can be included in the ink or the eradicator fluid.

The inks are manufactured by first melting the oxa acid(s) (if it is a solid at room temperature) and, if the ink contains a blend of oxa acid solvents, mixing the oxa acid solvents. Next, any co-solvents are mixed with the oxa-acid(s) until a homogeneous solution is obtained. If a solvent is being evaluated for suitability as a co-solvent, the resulting solution can be allowed to sit overnight to observe whether any biphasic or precipitous behavior (which would indicate unsuitability) occurs. Once the solvent system is thus prepared, any thickeners are added slowly with stirring and heating if necessary. When the thickener has dissolved, the dye is added (if the dye is a solid it is first ground to a fine powder) and dissolved with stirring and heating if necessary. Any other additives are then added and the ink is mixed until homogeneous.

The preferred eradicable inks can be used in eradicator systems such as those described in U.S. Pat. No. 5,649,999, the full disclosure of which is incorporated herein by reference.

EXAMPLE

Nine inks were prepared, using the procedure discussed above. The inks had the following formulations:

|  | 1 | 2 | 3 | 4 | 5 | 6 | 7 | 8 | 9 |
|---|---|---|---|---|---|---|---|---|---|
| Acid Blue 93 | [15 | 15 | 15 | 15 | 15 | 15 | 15 | 15 | 15] |
| Oxa Acid 1 | 85 | — | — | — | — | — | — | — | — |
| Oxa Acid 2 | — | 51 | 64 | 34 | 34 | 40 | 34 | 50 | 26 |
| Oxa Acid 3 | — | 34 | 21 | 51 | 51 | 42 | 40 | 33 | 26 |
| Co-solvent | — | — | — | — | — | — | — | — | 17 |
| PVP | — | — | — | — | 0.3 | 0.3 | 0.3 | 0.5 | 1 |
| Resin SK | — | — | — | — | — | — | 5 | — | 15 |
| Oleic Acid | — | — | — | — | — | — | — | 1.7 | — |

Oxa Acid 1 = 3,6,9-trioxaundecanedioic acid
Oxa Acid 2 = 3,6,9-trioxaundecanedioic acid
Oxa Acid 3 = 3,6,9-trioxadecanoic acid
Co-solvent = diethylene glycol monoethyl ether These inks were assembled into ball point pens, and provided high quality writing with good color intensity. The inks eradicated successfully with a sodium sulfite aqueous solution and with an alkyl amine aqueous solution.

Other embodiments are within the claims.

What is claimed is:

1. An eradicable ink comprising an acid dye that decolorizes if contacted with a decolorizing compound, and a solvent system comprising an oxa acid solvent in a sufficient quantity to dissolve the acid dye.

2. The eradicable ink of claim 1 wherein said oxa acid is the primary solvent for the acid dye.

3. The ink of claim 1 wherein said oxa acid solvent is selected from the group consisting of oxa acid solvents having the following general formulas:

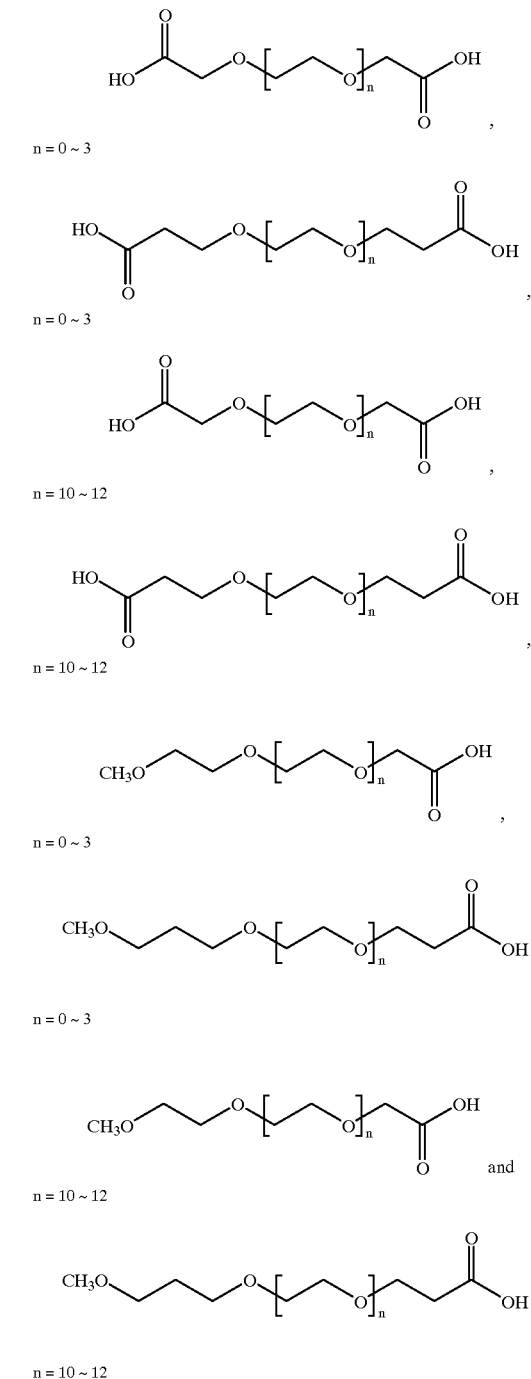

4. The ink of claim 1 wherein said solvent system comprises a blend of oxa acid solvents.

5. The ink of claim 4 wherein said blend comprises a blend of a mono-acid and a di-acid.

6. The ink of claim 5 wherein said blend comprises a blend of a 3,6,9-trioxaundecanedioic acid with a 3,6,9-trioxaundecanonic acid.

7. The ink of claim 1 wherein said acid dye is a sulfonated dye salt.

8. The ink of claim 1 wherein said ink contains less than 25% of the acid dye.

9. The ink of claim 1 wherein said ink contains less than 20% of the acid dye.

10. The ink of claim 1 wherein the solvent system includes at least 40% of the oxa acid solvent.

11. The ink of claim 10 wherein the solvent system includes at least 50% of the oxa acid solvent.

12. The ink of claim 1 further comprsing a thickener.

13. The ink of claim 1 further comprising an elastomer.

14. The ink of claim 1 wherein said oxa acid has a terminal acetonic or proprionic end group.

15. A solvent based pen ink, comprising an acid dye and a solvent system that includes an oxa acid solvent in a sufficient quantity to dissolve the acid dye.

16. The ink of claim 15 wherein said acid dye is a direct dye.

17. The ink of claim 15 wherein said acid dye is a carboxylated or sulfonated salt.

18. An eradicator system comprising:
   (a) an eradicable ink comprising an acid dye that decolorizes if contacted with a decolorizing compound, and a solvent comprising an oxa acid solvent; and
   (b) an eradictor fluid comprising a compound selected to cause said acid dye to change color.

19. The eradicator system of claim 18 further comprising a write-over ink comprising a dye selected to allow said write-over ink to form a permanent marking over an area covered by said eradicator fluid.

20. The eradicator system of claim 18 wherein said write-over ink includes a solvent system that comprises an oxa acid solvent.

21. A method of changing the color of an ink mark, comprising applying an ink to a substrate to provide an ink mark, said ink comprising a solvent system comprising an oxa acid solvent, and an acid dye that changes color if contacted with a chemical agent, dissolved in said solvent, and applying said chemical agent to said ink mark to cause said acid dye to change color.

\* \* \* \* \*